United States Patent
Rehfeld

(10) Patent No.: US 7,720,823 B1
(45) Date of Patent: *May 18, 2010

(54) REPAIRING LINKS IN DEACTIVATED FILES

(75) Inventor: Martin Rehfeld, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1092 days.

This patent is subject to a terminal disclaimer.

(21) Appl. No.: 11/386,195

(22) Filed: Mar. 21, 2006

Related U.S. Application Data

(63) Continuation of application No. 10/306,835, filed on Nov. 27, 2002, now Pat. No. 7,028,031.

(51) Int. Cl.
*G06F 17/30* (2006.01)

(52) U.S. Cl. .............. 707/691; 707/E17.107; 707/E17.116

(58) Field of Classification Search ............ 707/203, 707/101, 104.1, E17.107, E17.116
See application file for complete search history.

(56) References Cited

U.S. PATENT DOCUMENTS

| | | | | |
|---|---|---|---|---|
| 5,574,898 | A * | 11/1996 | Leblang et al. | 707/1 |
| 5,764,906 | A | 6/1998 | Edelstein et al. | |
| 5,884,309 | A | 3/1999 | Vanechanos, Jr. | |
| 5,995,099 | A | 11/1999 | Horstmann | |
| 6,134,552 | A * | 10/2000 | Fritz et al. | 707/10 |
| 6,219,676 | B1 * | 4/2001 | Reiner | 707/201 |
| 6,823,379 | B1 | 11/2004 | Heckel et al. | |
| 6,973,656 | B1 | 12/2005 | Huynh et al. | |
| 7,249,314 | B2 * | 7/2007 | Walker et al. | 715/205 |
| 7,529,778 | B1 * | 5/2009 | Dewey et al. | 707/203 |
| 2001/0044825 | A1 | 11/2001 | Barritz | |
| 2002/0120648 | A1 | 8/2002 | Ball et al. | |
| 2002/0147805 | A1 | 10/2002 | Leshem et al. | |
| 2003/0158871 | A1 * | 8/2003 | Fomenko | 707/203 |
| 2003/0208472 | A1 | 11/2003 | Pham | |
| 2004/0024848 | A1 | 2/2004 | Smith et al. | |

OTHER PUBLICATIONS

Hower, "Web Site Test Tools and Site Management Tools", downloaded from the internet on Oct. 14, 2002 at http://www.softwareqatest.com/qatwebl.html, 24 pages.
Microsoft Corporation, "Effective site Management with Microsoft FrontPage 2002", Microsoft Front Page, White Paper, May 2001, 15 pages.
In U.S. Appl. No. 11/448,958, filed Jun. 6, 2006, Office Action dated Dec. 7, 2009, 16 pages. (to be published by the USPTO).

* cited by examiner

*Primary Examiner*—Leslie Wong
(74) *Attorney, Agent, or Firm*—Fish & Richardson P.C.

(57) ABSTRACT

Methods and apparatus, including computer program products, implementing a technique for repairing links in a file. The file can contain one or more links, each link referring to a target file. For one or more of the links, a file identifier is stored that uniquely identifies the target. Alternatively, for one or more of the links, information is stored that identifies an old target and a new target for the link. The links can be repaired based on the stored information. The stored information can be used to identify changes to the links that occurred while the file containing the link was in a non-modifiable state, for example, in a deactivated state.

13 Claims, 3 Drawing Sheets

| Old Target Address | New Target Address |
|---|---|
| www.home.news.html | www.archive.news.html |
| ... | |

FIG. 4

| Old Target ID | New Target ID |
|---|---|
| File 001 | File 002 |
| ... | |

FIG. 5

| Commands |
|---|
| File.Move (New Location) |
| ... |

FIG. 6

REPAIRING LINKS IN DEACTIVATED FILES

CROSS-REFERENCE TO RELATED APPLICATIONS

This application is a continuation application of, and claims priority to, U.S. patent application Ser. No. 10/306,835, entitled Repairing Links in Deactivated Files, to inventor Martin Rehfeld, which was filed on Nov. 27, 2002 now U.S. Pat. No. 7,028,031. The disclosure of the above application is incorporated herein by reference in its entirety.

BACKGROUND

The present invention relates to repairing links in deactivated files.

A link is a pointer that refers to a target. In a file, a link can be represented as a uniform resource locator (URL) that specifies the address of the target. The target can be located in the same file as the file containing the link or in a different location, such as in another file. When the target of a link moves, the link can break or become ambiguous. A broken link is a link that points to a location that is empty because the target file that occupied the location has moved. An ambiguous link is a link that points to a location that is not empty, but contains a different target file.

Link management systems generally have tools that repair broken or ambiguous links. However, such tools do not work in all situations. For example, the tools cannot repair links in files that are deactivated. While a file is deactivated, the file cannot be modified. Deactivation of files commonly occurs in version control systems that freeze or deactivate older versions of a file in order to preserve the contents of the file. While a file is deactivated, the version control system prevents the link management system from modifying the links in the file.

SUMMARY

The invention provides methods and apparatus, including computer program products, for link management. The techniques include deactivating a first file, the first file containing one or more links, each link specifying an address of a target file; for one or more of the links in the first file, storing a file identifier that uniquely identifies the target file of the link; reactivating the first file; and repairing one or more of the links in the first file based on the stored file identifiers.

Particular implementations can include one or more of the following features. The stored file identifier can include a file name, file number, or file address of the target file. The link repair can include identifying broken or ambiguous links in the first file. The broken or ambiguous links can be repaired based on a pre-determined policy. A broken link can be repaired by using the stored file identifier for the link to locate a new address of the target file and modifying the link to refer to the new address. An ambiguous link can be repaired by selecting a target based on the pre-determined policy or based on user input.

The invention can be implemented to realize one or more of the following advantages. While a file is deactivated, the links in the file can be tracked to detect links that break or become ambiguous. A user can be notified about the broken or ambiguous links and can be provided with proposed repairs to the links. Alternatively, the repairs can be performed automatically without user input.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 4 illustrates one example of a data structure for tracking changes.

FIG. 5 illustrates another example of a data structure for tracking changes.

FIG. 6 illustrates another example of a data structure for tracking changes.

Like reference numbers and designations in the various drawings indicate like elements.

DETAILED DESCRIPTION

Figure 1:
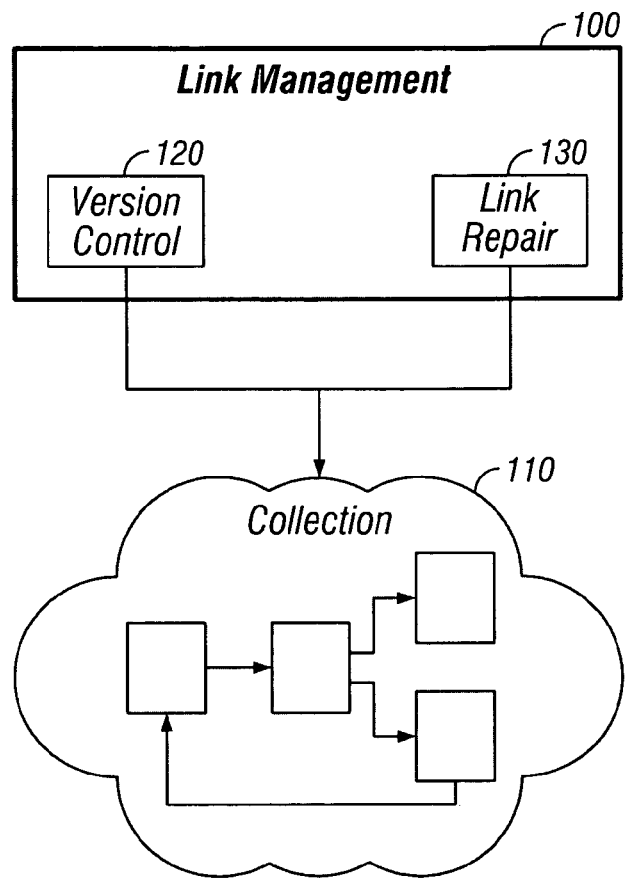
FIG. 1 is a block diagram illustrating a link management system.

FIG. 1 shows a link management system 100 which can be implemented as a stand-alone system or as a component of another system such as a web site or document management system. Examples of such other systems include the GoLive® web site management system available from Adobe Systems Incorporated of San Jose, Calif. and the Acrobat® document management system also available from Adobe Systems Incorporated.

The link management system 100 manages a collection 110 of linked files. The collection 110 can be stored locally or at a remote location that is accessible over a network such as a local area network or the Internet. The files within the collection 110 can be linked together in various arrangements (e.g., hierarchical, sequential, or circular) and can represent different types of content (e.g., web pages in a web site or pages of an e-book). An e-book (electronic book) is a set of electronic files that display human-readable content as ordered pages, thereby giving the appearance of a book. A web site is a collection of files that are accessible over the World Wide Web (web) and are owned and managed by a single entity.

The link management system 100 can include a version control component 120. The version control component 120 saves modifications to a file in a new version of the file instead of overwriting the original version. The contents of the original version is preserved for archival purposes so that at a later time, a user can compare the current version of the file with prior versions of the file. The most recently saved version of the file is referred to as the head version and is the only version of the file that can be modified (by a user or by the system 100). When a new head version is created, the version control system 120 deactivates the older version thereby preventing the older version from being modified while in the deactivated state. If a user wishes to modify a version that has been deactivated, the user can request that the system reactivate the old version so that the old version can be modified. Once the old version has been reactivated, it becomes the new head version and the former head version is deactivated.

The link management system 100 can include a link repair component 130. The link repair component 130 repairs broken or ambiguous links in a file. The link repair component 130 can also recalculate links in a file when the file is moved. The link repair component 130 can repair links in a file that is either active or deactivated.

To repair links in an active file, the link repair component 130 identifies broken or ambiguous links by detecting structural changes within the collection 110 including changes in the location or identity of a target file. The detection of structural changes can be implemented using conventional techniques, for example, by monitoring file move operations executed by the file system. Upon identifying a broken or ambiguous link, the link repair component 130 can modify the link to reflect the changed location or identity.

Figure 2:
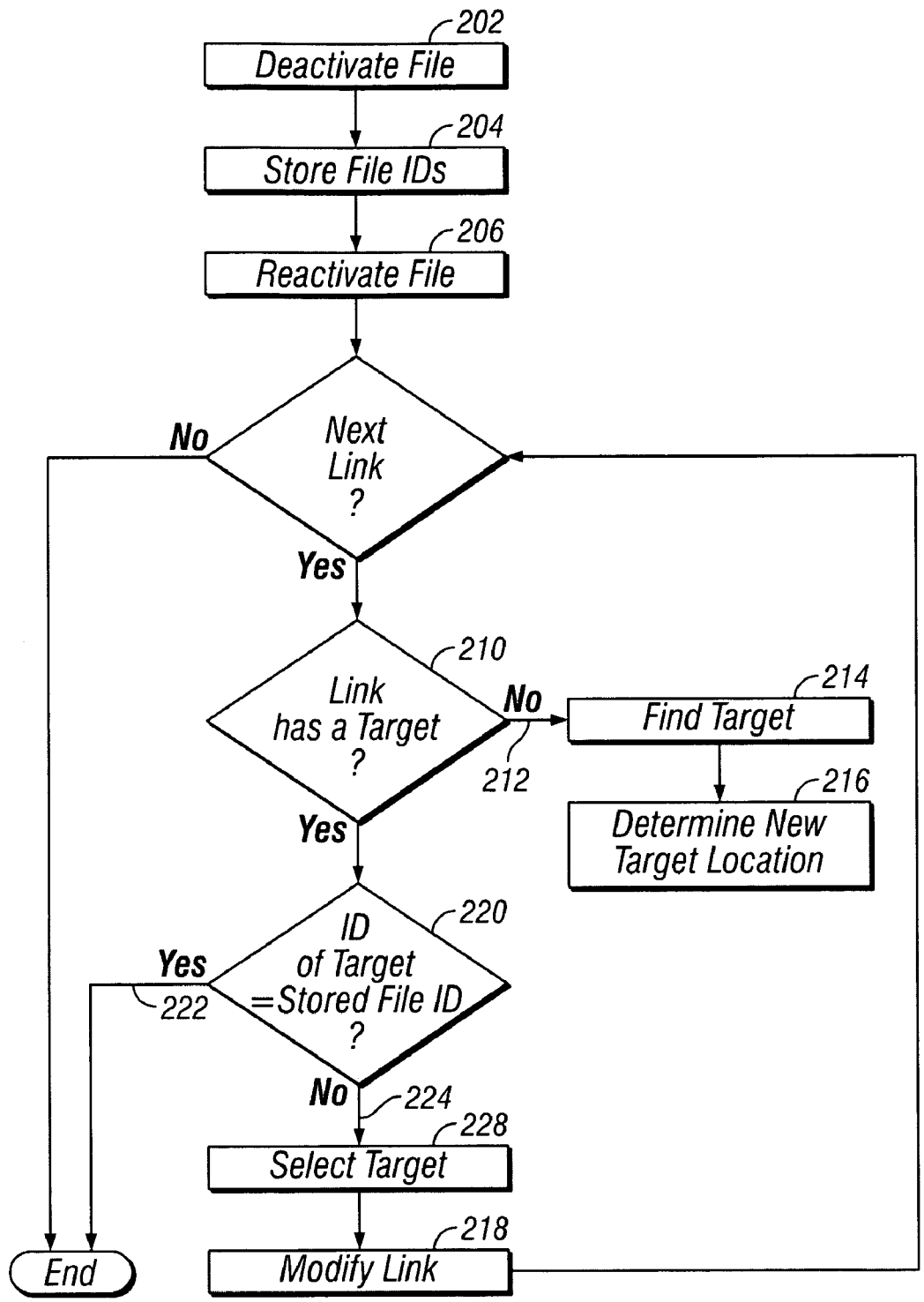
FIG. 2 is a flow diagram illustrating a method for repairing links in a deactivated file.

FIG. 2 shows a method 200 for repairing links in a deactivated file. The method begins when the version control component 120 deactivates a file in the collection 110 (202). The file contains one or more links, each link specifying an address of a target file. The deactivation of the file can occur in response to user input, such as a modification resulting in the creation of a newer version of the file being created. When the newer version is created, the version control component 120 deactivates the prior version and prevents the prior version from being further modified.

Before the file is deactivated, the link repair component 130 stores a file identifier (file ID) for each link in the file and also the address of the deactivated file (204). The information can be stored as part of the locked file or in a separate data structure.

The file ID corresponds to the target file of the link and uniquely identifies the target file within the collection 110. The file ID does not change even if the file is moved. The file ID can include metadata relating to the file and/or its contents. Metadata can include identifying information, such as a unique file identification number. In a system that uses a database to manage the files, the file ID can be a unique key (e.g., a primary key) of the database record corresponding to the file. Alternatively, metadata can more broadly refer to any data about the file or its contents. For example, the metadata can include a descriptive name or caption for the file.

Later, the version control component 120 reactivates the file (206). The reactivation can occur in response to the user input requesting that the file be reactivated. Reactivation of the file can also trigger reactivation of other files (e.g., image files) that are linked to the file. Reactivating the file causes the file to be reinstated as the new head version and causes the former head version to be deactivated.

Once the file is reactivated, the link repair component 130 examines the links in the file to determine whether the links are broken or ambiguous (208). For each link in the file, the link repair component 130 examines the location specified by the link to identify the current target (if any) of the link (210).

If no current target exists at the specified location, then the link is broken (212). To repair the broken link, the link repair component 130 uses the stored file ID for the link to locate the target (214). Upon locating the target, the link repair component 130 determines the new location of the target (216) and modifies the link to point to the new location (218). The modification can occur automatically without user intervention. Alternatively, the link repair component 130 can notify a user about the new location and receive user input confirming the new location.

If a current target exists at the specified location, then the link repair component 130 compares the file ID of the current target (current ID) with the stored file ID for the link (220). If the current ID is the same as the stored file ID, then the link is still intact (222) and does not need to be repaired.

If the current ID is different from the stored file ID, then the link is ambiguous (224). To repair the ambiguous link, the link repair component 130 can select a target (228), for example, by prompting the user to select between the current target and the stored target. If the current target is selected, the link does not need to be repaired because it already points to the current target. If the stored target is selected, then the link can be modified to point to the location of the stored target (218). Alternatively, instead of modifying the link, the link repair component 130 can move the stored target to the address specified by the link.

In one implementation, the repair of broken or ambiguous links can be performed automatically by the link repair component 130 without user intervention. The link repair component 130 can select a target for the broken or ambiguous link based on a pre-determined policy that specifies rules or criteria for selecting the target. For example, according to one policy, the link repair component 130 selects the target that is specified by the stored file ID; if that target cannot be located, then the link repair component 130 selects a substitute target that has a similar file name or address. If a substitute target cannot be selected, then the link repair component 130 prompts the user to select a target.

In addition to identifying broken or ambiguous links, the link repair component 130 can also use the stored address for the deactivated file to determine whether the file has moved (not shown). If the file has moved since the file was deactivated, the link repair component 130 can recalculate the address of any relative links in the file. Relative links are links that specify an address in a manner that is relative to the position of the file containing the links, for example, the address can be specified as the address of the file plus an offset. Alternatively, instead of modifying the links, the link repair component 130 can move the file to its former location.

Figure 3:
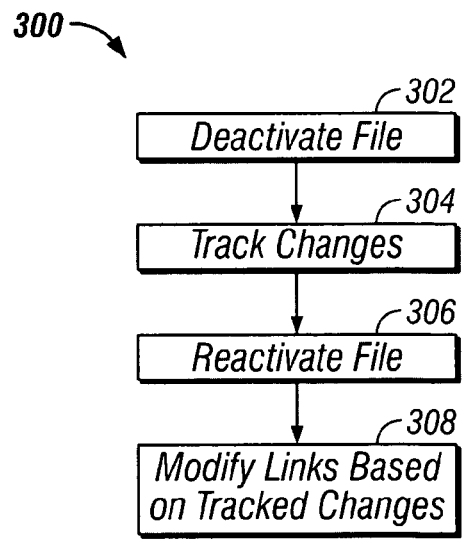
FIG. 3 is a flow diagram illustrating another method for repairing links in a deactivated file.

FIG. 3 shows another method 300 for repairing links in a deactivated file. Like method 200, method 300 begins when a file is deactivated (302).

While the file is deactivated, the link repair component 130 identifies changes to one or more of the links in the deactivated file and stores information identifying these changes, for example in a change log(304). The changes can be identified by tracking the changes or repairs that are made to the links in a file that is still active. For example, the active file can be a newer version of the file than the version that has been deactivated. As the link repair component 130 changes the links in the active file, the link repair component 130 maintains a log of the changes. For each changed link, the log can record the original target address and the new target address, as shown in FIG. 4. Alternatively, the log can record the original target file ID and the new target file ID, as shown in FIG. 5. In yet another implementation, instead of storing target information for the links, the link repair component 130 can store the file operations that caused the links to change (e.g., the move commands), as shown in FIG. 6.

When the deactivated file is later reactivated, (306) the link repair component 130 repairs the changed links in the reactivated file based on the stored information (308). The link repair component 130 modifies each changed link to refer to the new target instead of the old target. Alternatively, where file operations are stored instead of targets, the link repair component 130 determines the new target of the changed links by applying the stored file operations to the original target.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments and scenarios. Other embodiments and scenarios are within the scope of the following claims. For example, steps of the invention can be performed in a different order and still achieve desirable results. The invention can be used in electronic publishing systems, web publishing systems, or any other system that manages compound documents (documents containing references to others documents).

What is claimed is:

1. A computer-implemented method comprising:
   deactivating a first file, the first file containing one or more links, each link specifying an address of a target file; and
   while the first file is deactivated, storing information in a data structure separate from the first file, the stored information identifying changes affecting one or more links in the first file, the stored information identifying an old target file and a new target file for each affected link;
   wherein the old target file and the new target file are identified by specifying a file identifier for each target file, the file identifier being independent of the address of the target file.

2. The method of claim 1, wherein the old target file and the new target file are identified by specifying the address of each target file.

3. The method of claim 1, further comprising:
   reactivating the first file; and
   repairing the affected links in the first file based on the stored information.

4. The method of claim 3, wherein repairing the affected links in the first file includes modifying each affected link to reflect the new target file.

5. A computer program product, tangibly stored on a computer readable medium, the product comprising instructions operable to cause a programmable processor to:
   obtain information for repairing links in a first file being deactivated, each link specifying an address of a target file, each link corresponding to a link in a second file, and
   while the first file is deactivated, store information in a data structure separate from the first file, the stored information identifying changes affecting one or more links in the first file, the stored information identifying an old target file and a new target file for each affected link, and the stored information comprising a file identifier for each target file, the file identifier being independent of the address of the target file.

6. The computer program product of claim 5, further comprising instructions operable to cause the programmable processor to repair one or more of the links based on the stored information.

7. A computer-implemented method comprising:
   receiving a request to deactivate a first file, the first file including one or more links, each link specifying an address of a respective target file;
   deactivating the first file, each link in the first file not being modifiable while the first file is deactivated; and
   storing one or more file identifiers, each file identifier corresponding to a respective target file as of the time the first file is deactivated, being independent of the address of the respective target file, and being used to obtain a respective new address of each target file having a new address different from the address specified in the respective link as stored in the first file while the file was deactivated.

8. The method of claim 7, wherein:
   the address is a uniform resource locator.

9. The method of claim 7, wherein:
   the files are managed by a database; and
   the file identifier corresponding to one of the respective target files is a unique key for a database record corresponding to the respective target file.

10. A system comprising:
    means for deactivating a first file, the first file containing one or more links, each link specifying an address of a target file; and
    means for storing information in a data structure separate from the first file while the first file is deactivated, the stored information identifying changes affecting one or more links in the first file, the stored information identifying an old target file and a new target file for each affected link;
    wherein the old target file and the new target file are identified by specifying a file identifier for each target file, the file identifier being independent of the address of the target file.

11. The system of claim 10, wherein the old target file and the new target file are identified by specifying the address of each target file.

12. The system of claim 10, further comprising:
    means for reactivating the first file; and
    means for repairing the affected links in the first file based on the stored information.

13. The system of claim 12, wherein repairing the affected links in the first file includes modifying each affected link to reflect the new target file.

* * * * *